Patented Aug. 1, 1933

1,920,231

UNITED STATES PATENT OFFICE 1,920,231

COLOR PREPARATION FOR BUTTER, OLEOMARGARINE, ETC.

Leon Adler, St. Louis, Mo.

No Drawing. Application July 31, 1930
Serial No. 472,191

6 Claims. (Cl. 99—13.)

It is common and accepted practice for producers of certain oils and fats, such as butter, oleomargarine, etc., to color these products with various preparations, in order to make these commodities more pleasing to the eye and also to maintain a uniform and constant standard of color of the finished marketable commodity.

Heretofore, the coloring preparations used to produce the desired tint to the finished products, either in the distributing establishment or in the home of the ultimate consumer, most often consist of an oil-soluble color compound dissolved in an oil base or dispersed in some dry filler or base such as starch or the like.

Care is especially taken to keep these coloring preparations free from water prior to their intermixture with the oil or fat to be colored, for it was felt that if water were to be added, intentionally or unintentionally, the preparation would commence to deteriorate, or else the water would interfere with the solubility action of the pigment contained in the coloring preparation with the fat or oil being colored.

This invention has among its objects, the production of a coloring preparation for fats and oils, particularly of edible fats and oils such as butter and oleomargarine, in which the coloring preparation will be entirely free from oil, and upon the contrary will have an aqueous carrier.

Other objects and advantages of my invention are the production of a compound of the kind described, in which the same shall have extremely good keeping qualities, and in which there will be a minimum amount of foreign oils or fats carried into the commodity to be tinted, when my compound is used for tinting said commodity.

Many other objects and advantages of the preparation herein described will be obvious to those skilled in the art to which this invention appertains, from the disclosures herein given.

To this end, my invention consists in the novel composition of matter and the method of making the same, and the uses mentioned, and more particularly pointed out in the claims.

Certain commodities, particularly including edible oils and fats, such as butter, oleomargarine, etc., are either uncolored when freshly made, or else colored or tinted to different degrees of a color at various times of the year and at various localities of the country.

Such lack of uniformity of color is quite a drawback to sales appeal, as it leads possible purchasers to believe that differences of color are indicative of corresponding differences in quality.

Of course, the butter trade in general recognizes the fact that such differences in shade have no significance whatever as to quality, but demand a uniformly colored butter nevertheless, to satisfy their customers.

Various dyes are made for the purpose of coloring such commodities, the principal coloring dyes now being the well-known Yellow AB and Yellow OB colors. These colors are extremely highly concentrated in pigment form and hence must be diluted or intermixed with some sort of suitable carrier. They are either dissolved in an oil or fat carrier, the volume of the pigment being only a few percent of the entire volume of the dye, or the pigment is dispersed in some dry filler or carrier such as starch or the like.

As hereinbefore mentioned, these preparations are purposely kept free from water, as it was thought that water would interfere with the solubility of the preparations with the edible fat, and further that it would cause deterioration of the preparation.

It is well-known that water has better keeping qualities than oil or fat and will not become rancid or otherwise spoil; but, prior to this invention, water has not been used as a carrier or diluent for the pigment or coloring matter. Offhand, it would seem that if such a coloring matter were to be intermixed with water, the coloring matter would settle down to the bottom of the mixture and again be in its too-concentrated form. For this reason it is necessary to include as an ingredient of my compound, a dispersing agent, or suspension ingredient, whereby when added to the mixture, the coloring matter will be kept more or less uniformly distributed throughout the mixture.

The dye matter, such as the Yellow AB or Yellow OB previously mentioned, is first intermixed with a much larger quantity of water in any desired manner, and then a small quantity of some emulsifiant, dispersing agent, or suspension ingredient, as for example some gum, is added to and intermixed with the compound until the color will no longer settle out or deposit. Such a material, which I have found highly suitable for the purpose, is gum arabic, the same being non-objectionable as an ingredient of food-stuffs, and more especially so when one considers the comparatively small proportion of gum used.

Although the proportions may vary according to requirements and conditions, yet I have found that the ingredients in approximately the following proportions have given satisfaction:

| | Grams |
|---|---|
| Oil-soluble color matter | 2 to 3 |
| Water | 100 |
| Gum arabic | ½ to 1 |

The color matter is preferably oil-free, even though of course it should be oil-soluble, so that as little foreign oil or fat as possible may enter into the finished butter or oleomargarine.

In order to avoid freezing of the aqueous compound, various additional ingredients may be added, especially during the colder seasons of the year, as for example glycerin, in sufficient amounts to accomplish the desired purpose.

Having thus described my invention, it is obvious that various immaterial modifications may be made in the same without departing from the spirit of my invention; hence I do not wish to be understood as limiting myself to the exact proportion of parts or ingredients herein described, except as limited by the state of the art to which this invention pertains, and as limited by the claims.

What I claim as new and desire to secure by Letters Patent is:

1. A coloring preparation for coloring edible fats and oils, comprising an oil-free, oil-soluble and water-insoluble coloring matter, water, and sufficient gum to hold said coloring matter in suspension in said preparation, the preparation being in dilute liquid condition.

2. A coloring preparation for coloring edible fats and oils, comprising a mixture of the following ingredients in approximately the following proportions:

| | Grams |
|---|---|
| Oil-soluble coloring matter | 2 to 3 |
| Gum | ½ to 1 |
| Water | 100 |

3. A coloring preparation for edible fats and oils comprising an oil-free aqueous suspension in dilute liquid condition of a suitable oil soluble and water insoluble dye.

4. A coloring preparation for edible fats and oils comprising a suitable oil soluble and water insoluble coloring matter dispersed in water, and an inert oil-free dispersing agent, said preparation being in dilute liquid condition.

5. The method of coloring an edible fat or oil comprising the step of incorporating with and dispersing through said fat or oil an oil free aqueous suspension in dilute liquid condition of a suitable coloring material oil soluble and water insoluble dye.

6. That step in the method of making an edible fat or oil, which comprises uniformly incorporating therewith a coloring preparation comprising a suitable oil soluble and water insoluble coloring matter dispersed in water, and an inert oil free dispersing agent, said preparation being in dilute liquid condition, so that said resultant colored edible fat or oil will be substantially free of said suspension except the coloring material.

LEON ADLER.